April 7, 1931.  W. F. STOODY  1,799,261
BELT DRIVE AND TIGHTENING DEVICE
Filed Sept. 22, 1926  2 Sheets-Sheet 1
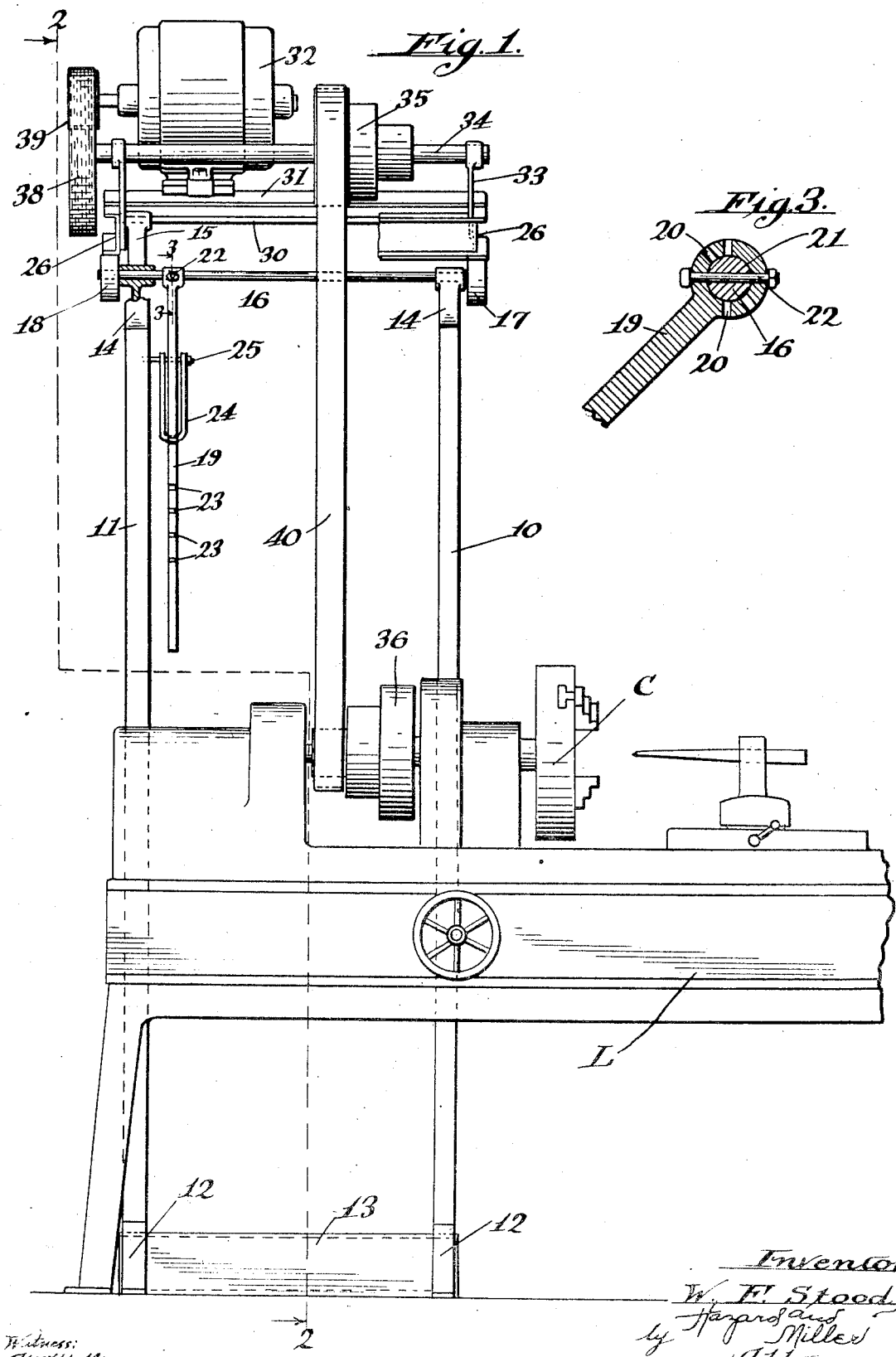

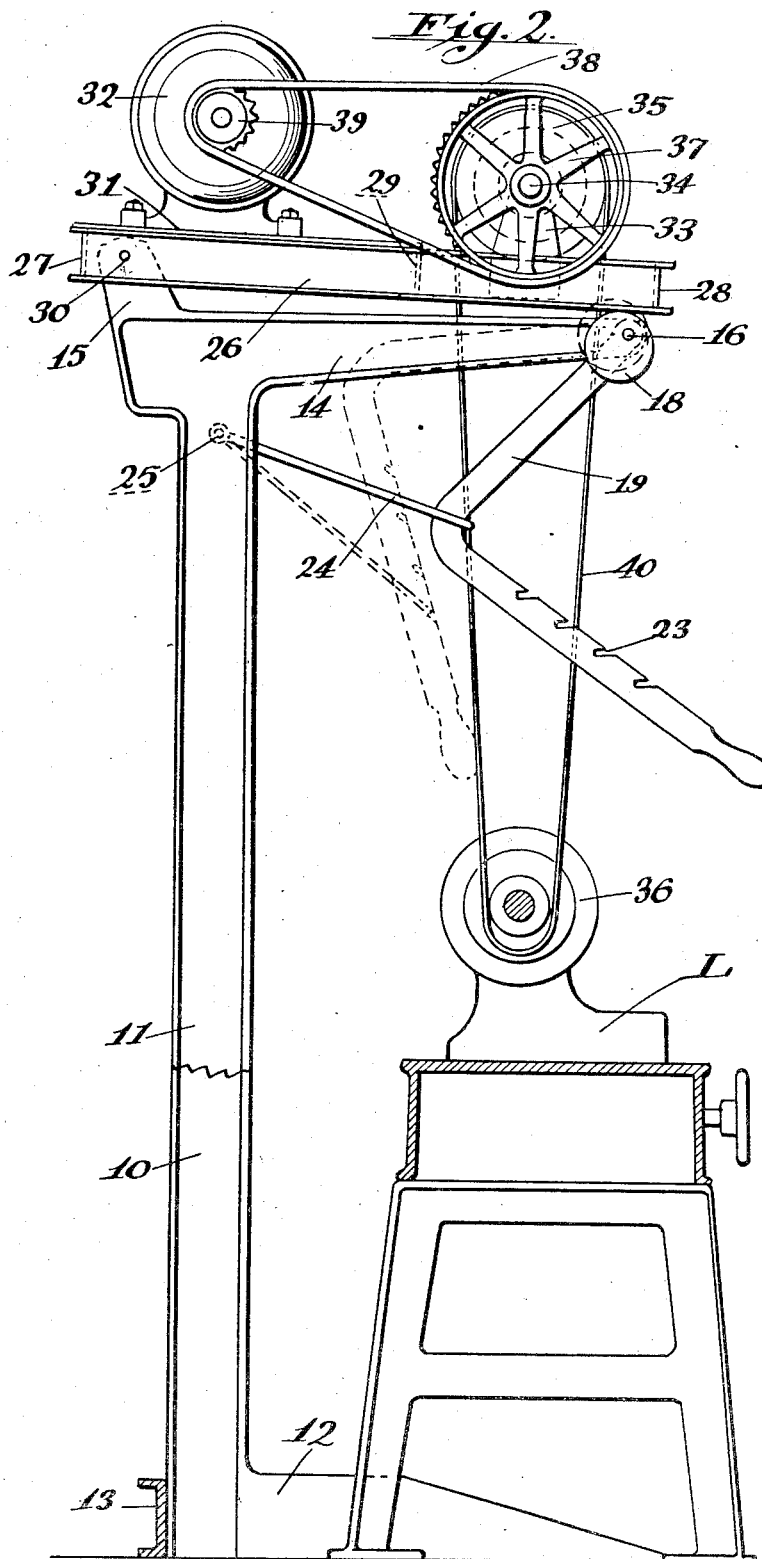

Patented Apr. 7, 1931

1,799,261

UNITED STATES PATENT OFFICE

WINSTON F. STOODY, OF WHITTIER, CALIFORNIA, ASSIGNOR TO STOODY CO., OF WHITTIER, CALIFORNIA, A CORPORATION OF CALIFORNIA

BELT DRIVE AND TIGHTENING DEVICE

Application filed September 22, 1926. Serial No. 137,036.

This invention relates to a belt drive and tightening construction adapted for use in connection with machine lathes, drill presses, shapers and similar machines. In machine shops the advantages of having a separate motor which is preferably an electric motor for each machine for driving the machine are now becoming well known. Many machines are now constructed in which the electric motor is incorporated in the machine as a part of it. However, many machines of prior construction are still in use in which the machine is driven by a line shaft.

An object of this invention is to provide a device adapted to be used in conjunction with such machines of prior construction, so that each machine can be driven by its own motor, thus eliminating the disadvantages of a line shaft and a large motor for driving it. Devices of this class have heretofore been constructed, but many of them are so designed as to be directly applied to the machine in conjunction with which they are to be used. They frequently have special castings which fit upon and fasten to parts of the machine, and because of this such prior devices providing separate drives for each machine are useless for other machines than those for which they have been designed.

Another object of this invention is to provide a device which can be supported on the floor adjacent the machine to be driven, and which is so constructed that it can be used to drive many different types of machines.

A further object of this invention is to provide a device adapted to drive a belt driven machine having a motor, and a shaft driven by the motor on which there are pulleys over which the belt passes, and to provide a simple, durable and efficient construction which will enable the belt to be tightened and loosened, and which will take up any stretching of the belt.

With the foregoing and other objects in view which will be made manifest in the following detailed description and specifically pointed out in the appended claims, reference is had to the accompanying drawings for an illustrative embodiment of the invention, wherein:

Figure 1 is a front elevation of a part of the machine lathe illustrating the improved device in applied position, Fig. 2 is a view taken substantially on the line 2—2 of Fig. 1, and Fig. 3 is a vertical section taken upon the line 3—3 of Fig. 1.

Referring to the accompanying drawings wherein similar reference characters designate similar parts throughout, the improved device consists of two vertical uprights 10 and 11 of such a length that when the lower ends of these uprights are resting on the floor, their upper ends will be a considerable and convenient distance above the top of ordinary machines found in machine shops and the like. At the bases of the two uprights 10 and 11 there are provided forwardly extending feet 12, and the uprights are joined to each other at their bases as by a channel iron 13. The upper ends of the uprights are provided with forwardly extending arms 14 which extend forwardly over the feet 12. At the rear ends of the arms 14 there are provided upstanding ears 15. Rotatably mounted in the forward ends of the arms 14 is a rock shaft 16 on which eccentrics 17 and 18 are keyed. A handle or crank is provided for rotating the rock shaft 16, such handle being indicated at 19, having a hub through which the rock shaft extends. The hub of the handle as shown in Fig. 3 has a plurality of diametrical apertures therethrough, which are indicated at 20 and which can be brought into register with a diametrical aperture 21 formed in the rock shaft 16. A bolt 22 which can be removed on loosening its nut passes through one of the apertures 20 and the aperture 21, thus fastening the handle to the rock shaft. The handle or crank 19 is preferably angular in form as shown in Fig. 2 and has a plurality of notches 23 formed thereon which are adapted to receive the clevis or bail 24 which is pivotally mounted as by a stud 25 upon the upright 11. A frame is pivotally mounted upon the top of the uprights, such frame consisting of two parallel channel irons 26 which are joined by channels 27 and 28 and an I bar 29. A rod 30 is positioned between the ears 15 and extends therethrough and into the channels 26, serving to pivotally connect the frame at its back to the ears. The forward ends of the channel 26 rest upon the tops of the eccentrics 17 and 18.

On the top of the frame thus provided there is fastened a plate 31 resting upon the channel 27 and the I bar 29. On this plate there is rigidly fastened an electric motor 32 of any preferred construction, or if desired any other suitable source of power can be employed. Bearings are provided in the upper ends of the arms 33 which are mounted on the frame adjacent its forward end and these bearings support a shaft 34 for rotation. On the shaft 34 there is a cone pulley 35 which is a counterpart of the similar element 36 on the lathe L shown upon the drawing. On the left end of the shaft 34 when looking at the device from its forward side there is a sprocket wheel 37, over which a noiseless chain 38 passes. This chain passes over a sprocket 39 on the rotor shaft of the motor, so that the shaft 34 can be driven by the motor. The conventional belt 40 passes over the pulleys 35 and 36, thus connecting the shaft 34 to the lathe spindle so that it may be driven thereby.

The operation of the improved device is as follows: When the handle 19 is in the position shown in Fig. 2, the frame is in its lowermost position and the belt 40 is loose, so that it can be shifted to vary the speeds, if desired. When it is desired to tighten the belt, the lower end of the handle 19 is thrust rearwardly, rotating the rock shaft 16 and thus rotating the cams 17 and 18, the cams or eccentrics by their engagement with the bottom of the channel irons 26 lift the forward end of the frame, thus lifting the shaft 34 and tightening the belt. The handle 19 is held in this rear position shown in dotted lines in Fig. 2 by the clevis or bail 24 entering one of the notches 23. In this position the motor 31 can drive the shaft 34 and cause the belt 40 to drive the lathe spindle. It will be readily appreciated that in order to change the belt to vary the speed the bail 24 can be moved out of one of the notches 23 and the handle allowed to swing forwardly, thus permitting the forward end of the frame to be lowered and loosening the belt 40. It will be found that by this construction the belt can be easily and quickly changed and can always be kept tight. In the event that the belt should stretch in the course of time, the bolt 22 is removed and the handle 19 is rotated and the bolt 22 thrust into another aperture 20, thus shifting the relation between the eccentrics and the handle, so that by the same rearward movement of the handle the forward end of the frame will be lifted higher to take up the stretch.

It will be noted that the motor 32 and the sprocket 37 are on the left side of the device when looking at it from the front. This arrangement is preferred for the following reasons: When the device is used in conjunction with the lathe which is quite large, the lathe chucks C are frequently shifted by means of a crane to and from the lathe spindle. If the motor 32 and the sprocket 37 were on the right hand side of the device, they would be apt to be struck by the crane lifting the chuck about. By the preferred arrangement this danger is entirely eliminated.

Because of the fact that the improved device rests on the floor and is provided with the feet 12, it will be appreciated that the device can be used to drive many different types of machines, and is not limited to use in conjunction with only one machine, which is a disadvantage of some prior construction.

It will be understood that various changes may be made in the detail of construction without departing from the spirit and scope of the invention as defined by the appended claims.

I claim:

1. A device of the class described comprising a portable support, a frame pivotally mounted upon said support, a motor mounted upon the frame, a shaft rotatably mounted upon the frame remote from the pivotal connection and driven by the motor, a rock shaft mounted upon the support beneath that end of the frame on which the shaft is mounted, eccentrics on the rock shaft engageable upon the frame for raising and lowering upon rotation of the rock shaft, and means for rotating the rock shaft and holding it in adjusted position.

2. A device of the class described comprising a portable support, a frame pivotally mounted upon said support, a motor mounted upon the frame, a shaft rotatably mounted upon the frame remote from the pivotal connection and driven by the motor, a rock shaft mounted upon the support beneath that end of the frame on which the shaft is mounted, eccentrics on the rock shaft engageable upon the frame for raising and lowering upon rotation of the rock shaft, a handle adjustably mounted upon the rock shaft for rotating the rock shaft, and means engageable upon the handle for holding it in adjusted position.

3. A device of the class described comprising uprights, feet on the uprights extending forwardly therefrom enabling the support to rest on the floor adjacent the machine to be driven, arms at the top of the uprights extending forwardly therefrom, a frame pivotally mounted upon the arms at the rear thereof, a motor mounted upon the frame, a shaft rotatably mounted adjacent the forward end of the frame, means connecting the shaft to the motor so that it may be driven thereby, and means for raising and lowering the forward end of the frame.

4. A device of the class described comprising uprights, feet on the uprights extending forwardly therefrom enabling the support to rest on the floor adjacent the machine to be driven, arms at the top of the uprights extending forwardly therefrom, a frame pivotally mounted upon the arms at the rear thereof, a motor mounted upon the frame, a shaft rotatably mounted adjacent the forward end of the frame, means connecting the shaft to the motor so that it may be driven thereby, eccentrics rotatably mounted adjacent the forward ends of the arms and supportingly engaging the frame, and means for rotating said eccentrics.

5. A device of the class described comprising uprights, feet on the uprights extending forwardly therefrom enabling the support to rest on the floor adjacent the machine to be driven, arms at the top of the uprights extending forwardly therefrom, a frame pivotally mounted upon the arms at the rear thereof, a motor mounted upon the frame, a shaft rotatably mounted adjacent the forward end of the frame, means connecting the shaft to the motor so that it may be driven thereby, a rock shaft rotatably mounted upon the forward ends of the arms, eccentrics on the rock shaft supportingly engaging the frame, a handle secured to the rock shaft for rotating it, and means engageable upon the handle to hold it in adjusted position.

In testimony whereof I have signed my name to this specification.

WINSTON F. STOODY.